Oct. 18, 1966  C. KATSAROS ET AL  3,279,985
FUNGICIDAL PROCESS
Filed Feb. 23, 1965
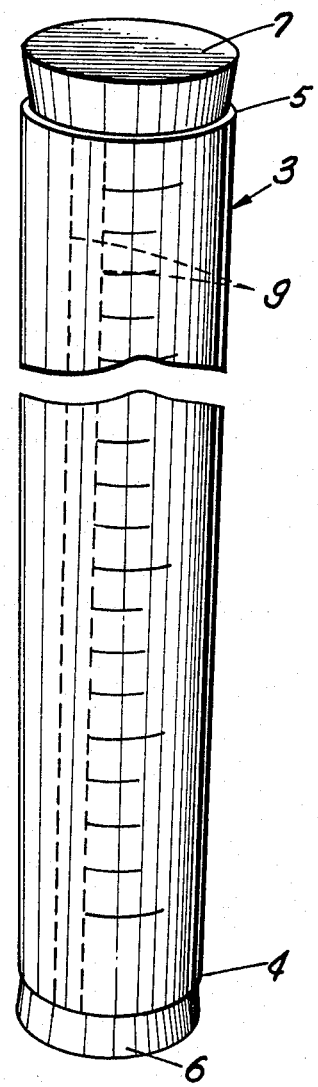
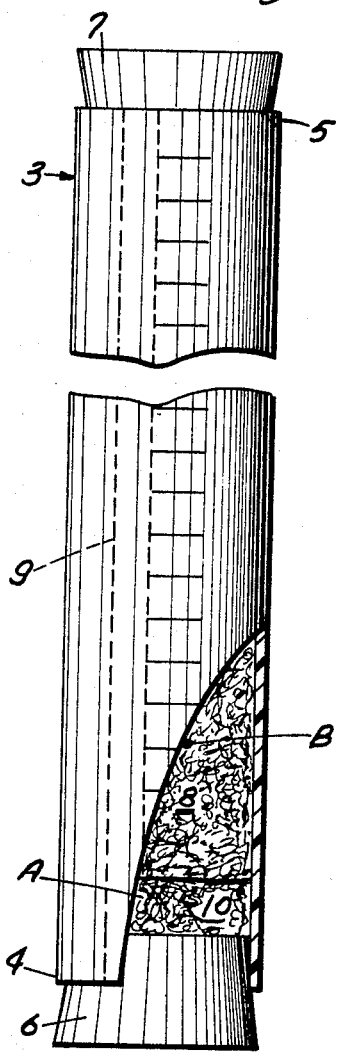
Inventors
Constantine Katsaros
Clare B. Kenaga
By
Pendleton, Neuman
Seibold & Williams
Attorneys – 3,279,985
FUNGICIDAL PROCESS
Constantine Katsaros, Crystal Lake, Ill., and Clare B. Kenaga, Lake Geneva, Wis., assignors to Morton International, Inc., a corporation of Delaware
Filed Feb. 23, 1965, Ser. No. 434,248
11 Claims. (Cl. 167—39)

This invention relates to a process for controlling soil borne fungal plant pathogens and more particularly to a process for controlling fungi, which comprises applying to fungi and fungal colonies a composition containing methyl isothiocyanate and chloropicrin (in this application chloropicrin shall be understood to refer to trichloronitromethane).

Methyl isothiocyanate utilized in the process of this invention is known to have fungicidal properties. Chloropicrin also displays fungicidal activity. It has been found, however, that the composition formed from the combination of the aforesaid compounds displays an enhanced or synergistic activity in that it is more effective as an antifungal agent than the additive effect of the components when used alone. Since many fungi which inhabit soils are responsible for both pre-emergence and post-emergence damping-off of seedlings as well as other deleterious effects, improved methods for their control are desirable.

Accordingly, it is an object of this invention to provide an improved process for controlling fungal infestations.

It is another object of this invention to provide a process for controlling soil borne fungi, such as, for example, those of the genera Fusarium, Pythium, Rhizoctonia, Aspergillus, Penicillium and Rhizopus.

A further object of this invention is the provision of a process for controlling the pre-emergence and post-emergence damping-off of seedlings in nurseries, greenhouses and farms.

Further and additional objects will be apparent from the description and the claims.

In one broad form the present invention comprises a process for controlling plant pathogenic fungi by applying thereto an admixture of methyl isothiocyanate and chloropicrin. The proportions of the ingredients present in the composition used in the process of this invention may vary over a wide range. Broadly, the composition may contain, on a relative proportion basis, from about 1 to about 70 percent by weight of methyl isothiocyanate and from about 30 to about 99 percent by weight of chloropicrin. Preferably, the methyl isothiocyanate component is present in the admixture on a relative proportion basis of from about 10 to about 30 percent by weight and the chloropicrin in amounts of from about 70 to about 90 percent by weight. In the most preferred embodiment of the present invention, the methyl isothiocyanate component is present in the admixture, on a relative proportion basis, at a concentration of 20 percent by weight and chloropicrin at a concentration of 80 percent by weight.

Particular fungi infestations to which the compositions used in the present invention are applied with beneficial effect are common soil borne fungi of the genera selected from the group consisting of Fusarium, Pythium, Rhizoctonia, Aspergillus, Penicillium and Rhizopus.

TEST PROCEDURE

The test procedure employed in obtaining data for the evaluation of the process of the present invention is as follows:

FIG. 1 of the drawing illustrates a shortened perspective view of the tube used in the testing procedure described.

FIG. 2 is a perspective view of the tube of FIG. 1 partially broken away at the surface to show the contents thereof.

In FIG. 1, the tub 3 in the preferred form is polyethylene. The ends of the tube 4 and 5, respectively, are filled with a pair of corks 6 and 7. A scale is shown superimposed on the drawings to illustrate how the measurements are made. As shown in FIG. 2, the tube 3 is filled with soil 8 and has a bed of quartz sand 10 adjacent end 4 between cork 6 and the soil 8. The dotted lines 9 show generally how the cut is made to remove soil specimens after testing a particular composition, as is more fully explained hereinafter. A designates the site of application of a test chemical or composition. B represents a typical point, removed from site A, from which point a soil specimen is removed after a predetermined incubation period.

Polyethylene tubes, 17 inches long with 1¼ inch I.D., are utilized in these tests. One end of the polyethylene tube is stoppered by inserting a cork approximately 1½ inches into one end of the tube. Three hundred and seventy grams of soil are then placed uniformly in the tube. The column is filled to approximately 1 inch from the open end of the polyethylene tube. A ¼ inch layer of washed, dry quartz sand is placed on top of the soil, and the chemical or composition to be tested is pipetted directly on the layer of sand. A second cork stopper is immediately pushed into the tube to the point of contact with the layer of sand. Plastic tape is then used to seal this second cork stopped to the polyethylene tube. Two tubes are prepared for each concentration of a given test chemical.

The soil used in these tests contains a fungal flora common to most soils, including Aspergillus spp., Penicillium spp., Rhizopus sp., Fusarium spp., Pythium spp., Rhizoctonia sp., etc. The soil is a black loam soil containing 16 percent moisture on an air dry basis which is approximately 60 percent of its water holding capacity.

Untreated check tubes are also prepared. The tubes are then stored in a horizontal position for 72 hours at room temperature (72° F.). At the end of the 72 hours storage period, a strip ½ inch wide is cut along the length of each tube by means of a sterile razor blade. The cut is made beginning at the point of chemical application, down the length of the tube. The strip is then removed, exposing the soil. A layer of soil ⅛ inch deep is then removed and discarded. This is done by scraping with a sterile spatula along the exposed strip of soil, beginning at the point of chemical application, down the length of the tube. The soil column thus exposed is ½ inch wide and approximately 14 inches long. Approximately 0.5 cc. samples of soil are removed at one inch intervals along the length of the exposed soil column. Each soil sample is sprinkled on the surface of sterile potato dextrose agar in a Petri plate. The potato dextrose agar contains 3,000 micrograms of Streptomycin per 100 cc. of media and is acidified with lactic acid to pH 4.5. Sterile techniques are employed in each of these procedures. The purpose of incorporating the antibacterial streptomycin in the potato dextrose agar is to inhibit bacterial growth and thus prevent the formation of natural antibiotic substances which would interfere with the determination of the number of fungal colonies. Streptomycin is, of course, innocuous to fungi. At the end of three days' storage at room temperature, the check plates in each test are read under a low power microscope to determine the average number of fungal colonies per soil sample. The plates from the treated soil are read in a similar manner at the end of four days. The average number of colonies growing per plate on the untreated check samples are used as the basis for determining the estimated LD–90, LD–99 or LD–100 zones.

The determinations tabulated in the following examples represent distances in inches of fungal kill (LD–90, LD–99 or LD–100) obtained by application of the respective test compounds. Fractional figures are the result of averaging of replicates.

The average number of fungal colonies found in an untreated check plate after a 3 day incubation period conveniently ranges from about 800 to about 1000. This range lends itself readily to counting with the aid of a microscope. An incubation period greater than 3 days results in an excessive proliferation of fungal colonies which grow together making it extremely difficult to obtain an accurate count. Plates from treated soil are read after an incubation period of 4 days. The added day of incubation assures a more accurate count of viable fungi.

The terms "LD–90," "LD–99" and "LD–100" as used herein have the following meanings:

LD–90—That dosage of test compound which is lethal to approximately 90 percent or more (but less than 99 percent) of the fungal infestation as determined in the check. Conversely, it may also be defined as that dosage of test compound which is lethal to all but from 1 to 10 percent of the fungal infestation.

LD–99—That dosage of test compound which is lethal to approximately 99 percent but less than 100 percent of the fungal infestation as determined in the check. Conversely, it may also be defined as that dosage which is lethal to all but 1 percent of the fungal infestation.

LD–100—That dosage of test compound which results in complete fungal kill.

The following examples illustrate the effectiveness of the process of this invention when used to control and destroy fungal infestations in soil and the synergism exhibited by the compositions used in this process.

*Example I*

Compositions containing 50 percent by weight of methyl isothiocyanate and 50 percent by weight of chloropicrin were utilized in the aforementioned procedure at dosages of 10, 20, 40 and 80 milligrams per tube, respectively. Methyl isothiocyanate alone and chloropicrin alone were simultaneously carried through the same procedure. An untreated check determination was made to provide a standard from which LD–90 readings were determined.

The abbreviations "MIT" and "CP," used throughout the following tables, refer to methyl isothiocyanate and chloropicrin, respectively.

The results are set forth in Table I.

TABLE I

| Concentration, Milligrams/Tube | | | Zone of Fungal Kill in Inches | | | |
|---|---|---|---|---|---|---|
| | | | Actual | | Theoretical [1] | |
| MIT | CP | Total | LD-100 | LD-90 | LD-100 | LD-90 |
| 5 | -- | 5 | 0 | 0 | -------- | -------- |
| 10 | -- | 10 | 0 | 0 | -------- | -------- |
| 20 | -- | 20 | 0 | 1 | -------- | -------- |
| 40 | -- | 40 | 1 | 2 | -------- | -------- |
| ----- | 5 | 5 | 0 | 0 | -------- | -------- |
| ----- | 10 | 10 | 0 | 0 | -------- | -------- |
| ----- | 20 | 20 | 0 | 0 | -------- | -------- |
| ----- | 40 | 40 | 0 | 2½ | -------- | -------- |
| 5 | 5 | 10 | 0 | ½ | 0 | 0 |
| 10 | 10 | 20 | ½ | 2 | 0 | 0 |
| 20 | 20 | 40 | 3 | 6½ | 0 | 1 |
| 40 | 40 | 80 | 7½ | 10 | 1 | 4½ |

[1] The theoretical zone of fungal kill is calculated by computing the sum of the additive contributions of the individual components of a composition.

A comparison of the actual zone of fungal kill with the theoretical zone of fungal kill illustrates the enhanced fungicidal activity (synergism) displayed by a combination of methyl isothiocyanate and chloropicrin over the additive contributions of the individual components.

*Example II*

Compositions containing 50 percent by weight of methyl isothiocyanate and 50 percent by weight of chloropicrin were utilized at composition dosage levels of 20, 40, 60, 80 and 100 milligrams, respectively, according to the aforementioned test procedure. In addition, methyl isothiocyanate alone and chloropicrin alone at dosage levels of 10, 20, 30, 40 and 50 milligrams per tube, respectively, were carried through the same test procedure. An untreated check was also carried through the test procedure to provide a standard from which LD–100 and LD–99 values could be determined.

Table II sets forth the results obtained.

TABLE II

| Concentration, Milligrams/Tube | | | Zone of Fungal Kill in Inches | | | |
|---|---|---|---|---|---|---|
| | | | Actual | | Theoretical | |
| MIT | CP | Total | LD-100 | LD-99 | LD-100 | LD-99 |
| 20 | -- | 20 | 0 | 0 | -------- | -------- |
| 40 | -- | 40 | 0 | 2 | -------- | -------- |
| 60 | -- | 60 | 0 | 3½ | -------- | -------- |
| 80 | -- | 80 | 3 | 6 | -------- | -------- |
| 100 | -- | 100 | 3½ | 5½ | -------- | -------- |
| ----- | 20 | 20 | 0 | 0 | -------- | -------- |
| ----- | 40 | 40 | 0 | 0 | -------- | -------- |
| ----- | 60 | 60 | 0 | ½ | -------- | -------- |
| ----- | 80 | 80 | 0 | 2 | -------- | -------- |
| ----- | 100 | 100 | 0 | 0 | -------- | -------- |
| 10 | 10 | 20 | ½ | 2 | 0 | 0 |
| 20 | 20 | 40 | 2 | 4 | 0 | 0 |
| 30 | 30 | 60 | 4 | 6 | 0 | 2 |
| 40 | 40 | 80 | 5½ | 7½ | 0 | 2 |
| 50 | 50 | 100 | 5½ | 7½ | 0 | 4 |

Comparing the actual zone of fungal kill, LD–100, with the theoretical zone of fungal kill, LD–100, it is seen that the methyl isothiocyanate-chloropicrin admixture provides complete kill over a zone ranging from ½ inch for a concentration per tube of 20 milligrams to 5½ inches for a concentration per tube of 100 milligrams whereas the theoretical zone of fungal kill is zero.

Comparing the actual zone of fungal kill, LD–99, with the theoretical zone of fungal kill, LD–99, it is seen that the methyl isothiocyanate-chloropicrin admixture at concentrations of 20 and 40 milligrams per tube, respectively, provides zones of fungal kill of 2 and 4 inches, respectively, whereas the theoretical zone of fungal kill in each instance is zero. For admixture concentrations of 60, 80 and 100 milligrams per tube, respectively, zones of fungal kill of 6, 7½ and 7½ inches, respectively, are obtained. These are in marked contrast with the comparable theoretical zones of 2, 2 and 4 inches, respectively.

*Example III*

Compositions containing an admixture of methyl isothiocyanate and chloropicrin in the following proportions were utilized in the test procedure at dosage levels of 10, 20, 40, 60, 80 and 100 milligrams per tube, respectively:

| Methyl isothiocyanate, percent | 30 | 40 | 60 | 70 |
|---|---|---|---|---|
| Chloropicrin, percent | 70 | 60 | 40 | 30 |

Methyl isothiocyanate alone, chloropicrin alone, and an untreated check were also carried through the same test procedure.

Table III sets forth the results obtained:

TABLE III

| Concentration, Milligrams/Tube | | | Zone of Fungal Kill in Inches | |
|---|---|---|---|---|
| | | | Actual | Theoretical |
| MIT | CP | Total | LD-100 | LD-100 |
| 20 | ------ | 20 | 0 | ------ |
| 40 | ------ | 40 | 0 | ------ |
| 60 | ------ | 60 | 1½ | ------ |
| 80 | ------ | 80 | 3 | ------ |
| 100 | ------ | 100 | 3½ | ------ |
| ------ | 40 | 40 | 0 | ------ |
| ------ | 60 | 60 | ½ | ------ |
| ------ | 80 | 80 | 1 | ------ |
| ------ | 100 | 100 | 0 | ------ |
| 6 | 4 | 10 | 0 | 0 |
| 12 | 8 | 20 | 0 | 0 |
| 24 | 16 | 40 | 1 | 0 |
| 36 | 24 | 60 | 2 | 0 |
| 48 | 32 | 80 | 3 | 1½ |
| 4 | 6 | 10 | 0 | 0 |
| 8 | 12 | 20 | 0 | 0 |
| 16 | 24 | 40 | 1 | 0 |
| 24 | 36 | 60 | 4 | 0 |
| 32 | 48 | 80 | 5 | ½ |
| 7 | 3 | 10 | 0 | 0 |
| 14 | 6 | 20 | 0 | 0 |
| 28 | 12 | 40 | 1½ | 0 |
| 42 | 18 | 60 | 2 | 1½ |
| 56 | 24 | 80 | 2 | 1½ |
| 3 | 7 | 10 | 0 | 0 |
| 6 | 14 | 20 | ½ | 0 |
| 12 | 28 | 40 | 2 | 0 |
| 18 | 42 | 60 | 5½ | ½ |
| 24 | 56 | 80 | 6½ | ½ |
| 30 | 70 | 100 | 8 | 1 |

These results illustrate the synergistic effect obtained by the indicated admixtures of methyl isothiocyanate and chloropicrin.

*Example IV*

Compositions containing an admixture of methyl isothiocyanate and chloropicrin in the following proportions were utilized in the test procedure at dosage levels of 10, 20, 40, 60, 80 and 100 milligrams per tube, respectively:

| Methyl isothiocyanate, percent | 1 | 5 | 10 | 20 |
|---|---|---|---|---|
| Chloropicrin, percent | 99 | 95 | 90 | 80 |

Methyl isothiocyanate alone and chloropicrin alone were carried through the same test procedure, along with an untreated check.

TABLE IV

| Concentration, Milligrams/Tube | | | Zone of Fungal Kill Inches | | | |
|---|---|---|---|---|---|---|
| | | | Actual | | Theoretical | |
| MIT | CP | Total | LD-100 | LD-99 | LD-100 | LD-99 |
| 5 | ---- | 5 | 0 | 0 | ------ | ------ |
| 10 | ---- | 10 | 0 | 1 | ------ | ------ |
| 20 | ---- | 20 | 0 | 1½ | ------ | ------ |
| 40 | ---- | 40 | 0 | 3½ | ------ | ------ |
| 60 | ---- | 60 | 2½ | 4½ | ------ | ------ |
| 80 | ---- | 80 | 2½ | 4½ | ------ | ------ |
| 100 | ---- | 100 | 3 | 5 | ------ | ------ |
| ---- | 20 | 20 | 0 | 0 | ------ | ------ |
| ---- | 40 | 40 | 0 | 0 | ------ | ------ |
| ---- | 60 | 60 | 0 | 1 | ------ | ------ |
| ---- | 80 | 80 | 0 | ½ | ------ | ------ |
| ---- | 100 | 100 | 0 | 2 | ------ | ------ |
| 2 | 8 | 10 | 0 | ½ | 0 | 0 |
| 4 | 16 | 20 | 0 | 2½ | 0 | 0 |
| 8 | 32 | 40 | 2½ | 6½ | 0 | 1 |
| 12 | 48 | 60 | 6½ | 8½ | 0 | 2½ |
| 16 | 64 | 80 | 7½ | 10 | 0 | 2 |
| 20 | 80 | 100 | 8½ | 10 | 0 | 2 |
| 2 | 18 | 20 | 0 | 2½ | 0 | 0 |
| 4 | 36 | 40 | 3 | 6½ | 0 | 0 |
| 8 | 72 | 80 | 6 | 9 | 0 | 1½ |
| 10 | 90 | 100 | 7 | 7½ | 0 | 3 |
| 1 | 19 | 20 | 0 | 1 | 0 | 0 |
| 2 | 38 | 40 | ½ | 6 | 0 | 0 |
| 3 | 57 | 60 | 4½ | 7½ | 0 | 1 |
| 4 | 76 | 80 | 4 | 7½ | 0 | ½ |
| 0.2 | 99.8 | 100 | 0 | 2 | 0 | 2 |
| 0.4 | 99.6 | 100 | 0 | 4 | 0 | 2 |
| 0.6 | 99.4 | 100 | ½ | 4½ | 0 | 2 |
| 0.8 | 99.2 | 100 | 1½ | 4½ | 0 | 2 |

These results demonstrate the synergistic fungicidal effect obtained by admixtures containing as little as 1% of methyl isothiocyanate and as much as 99% of chloropicrin.

While the foregoing compositions may be applied to the fungi in their habitats, more particularly soil in their undiluted form, where desirable they may also be applied in combination with inert, inactive diluents or carriers. Such diluents and carriers aid in the distribution of the active synergistic composition. Exemplary of solvents which may be used as diluents or carriers in conjunction with the present synergistic compositions are deodorized kerosene, ketones, esters, various low-boiling petroleum fractions, and the like.

The amount of material applied in carrying out the process of this invention will vary according to the type of infestation and the character of the particular area to be treated. Application of the composition at rates ranging broadly from about 5 to about 100 gallons per acre foot, and preferably from 20 to 100 gallons per acre foot, is satisfactory. As may be understood, the effectiveness of a particular dosage will vary somewhat with the mode or technique of application and the type of organism infesting the soil. The state of the fungi is also a factor in control, the spore being more resistant than the actively proliferating cells.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process for controlling pathogenic soil fungi which comprises applying to the said fungi an admixture of methyl isothiocyanate and chloropicrin.

2. A process for controlling fungal infestations which comprises applying to fungi and their habitats an admixture of methyl isothiocyanate and chloropicrin.

3. A process for controlling fungi comprising applying a composition containing methyl isothiocyanate and chloropicrin to fungi of the genera selected from the group consisting of Fusarium, Pythium, Rhizoctonia, Aspergillus, Penicillium and Rhizopus.

4. A process according to claim 1 wherein the admixture contains, on a relative proportion basis, from about 1 to about 70 percent by weight of methyl isothiocyanate and from about 30 to about 99 percent by weight of chloropicrin.

5. A process according to claim 1 wherein the admixture contains, on a relative proportion basis, from about 10 to about 30 percent by weight of methyl isothiocyanate and from about 90 to about 70 percent by weight of chloropicrin.

6. A process according to claim 1 wherein the admixture contains, on a relative proportion basis, about 20 percent by weight of methyl isothiocyanate and about 80 percent by weight of chloropicrin.

7. A process according to claim 1 wherein the admixture is applied in conjunction with an inert carrier.

8. A process according to claim 1 wherein the admixture is applied to the soil at a rate of from about 5 to about 100 gallons per acre foot.

9. A process for controlling fungal infestations which comprises applying to fungi in their habitat from about 5 to about 100 gallons per acre foot of an admixture containing, on a relative proportion basis, from about 1 to about 70 percent by weight of methyl isothiocyanate and from about 30 to about 99 percent by weight of chloropicrin.

10. A process according to claim 9 wherein the fungi are selected from the group consisting of Fusarium, Pythium, Rhizoctonia, Aspergillus, Penicillium and Rhizopus.

11. A process according to claim 9 wherein the admixture contains on a relative proportion basis from 10 to 70 percent by weight of methyl isothiocyanate and from about 30 to 90 percent by weight of chloropicrin.

References Cited by the Examiner

UNITED STATES PATENTS

| | | | |
|---|---|---|---|
| 1,983,546 | 12/1934 | Johnson | 167—39 |
| 3,026,244 | 3/1962 | Youngson et al. | 167—22 |
| 3,026,246 | 3/1962 | Youngson et al. | 167—22 |
| 3,113,908 | 10/1963 | Pieroh et al. | 167—39 |
| 3,154,467 | 10/1964 | Katsaros et al. | 167—22 |
| 3,205,129 | 9/1965 | Kenaga et al. | 167—22 |

OTHER REFERENCES

Chem. Abstracts 54: 3607a; 6012g, (1960).
Chem. Abstracts 55: 13754e, (1961).

ELBERT L. ROBERTS, *Primary Examiner.*

S. K. ROSE, *Assistant Examiner.*